Figure 4:
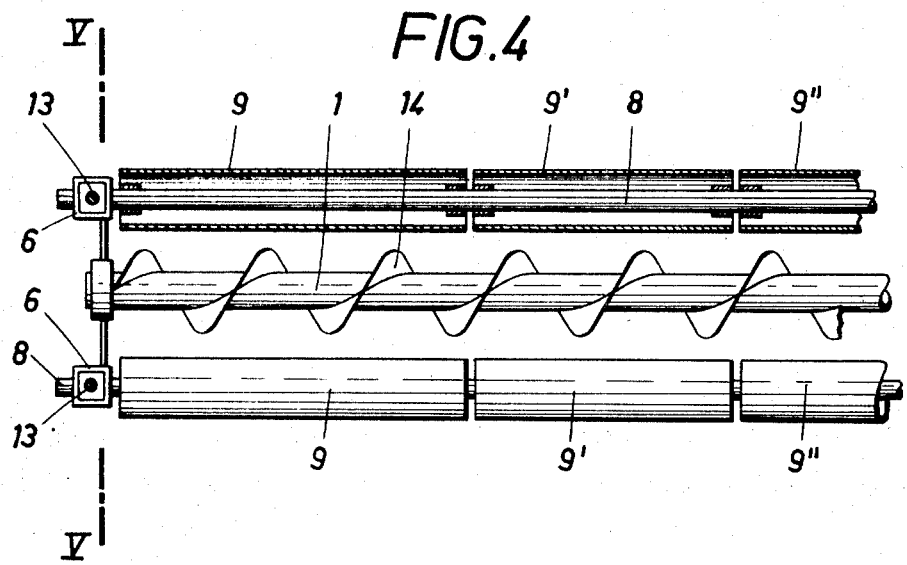

United States Patent [19]

Scherz

[11] 3,750,903
[45] Aug. 7, 1973

[54] UNLOADER FOR REMOVING STOCK FOR A BODY OF STOCK CONTAINER IN A STORAGE SPACE

[76] Inventor: Karl Scherz, Hauptplatz 7, Deutschlandsberg, Austria

[22] Filed: July 13, 1971

[21] Appl. No.: 162,042

[30] Foreign Application Priority Data
July 21, 1970 Austria.................................. 6615

[52] U.S. Cl. ............................................ 214/17 DB
[51] Int. Cl. ............................................ B65g 65/38
[58] Field of Search ................................. 214/17 DB

[56] References Cited
UNITED STATES PATENTS

| | | | |
|---|---|---|---|
| 2,037,959 | 4/1936 | Bean........................... | 214/17 DB |
| 3,462,199 | 8/1969 | Harris et al................. | 214/17 DB X |
| 3,055,649 | 9/1962 | Dretzke et al............... | 214/17 DB |
| 3,090,506 | 5/1963 | Buschbom.................... | 214/17 DB |
| 3,487,961 | 1/1970 | Neuenschwander........... | 214/17 DA |

Primary Examiner—Robert G. Sheridan
Attorney—Kurt Kelman

[57] ABSTRACT

An unloader arm is adapted to be mounted over the body of stock. Stock-detaching and conveying means are carried by said unloader arm and adapted to engage said body of stock and to detach stock therefrom, and to convey detached stock for removal from said storage space. Two pressure rolls are carried by said unloader arm and disposed on opposite sides of said stock-detaching and conveying means and extend parallel thereto and are arranged to apply pressure to said body of stock as said stock-detaching and conveying means engage said body of stock.

11 Claims, 5 Drawing Figures

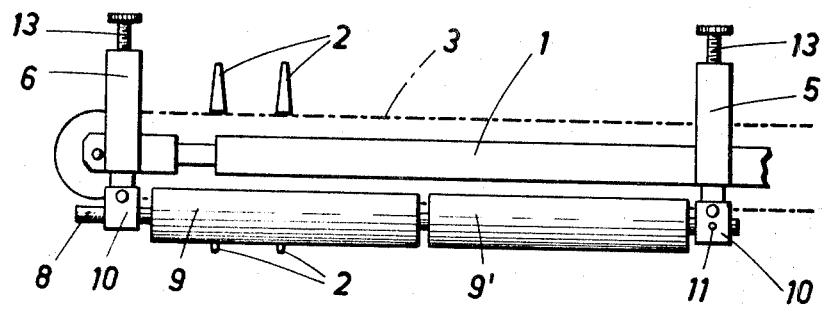
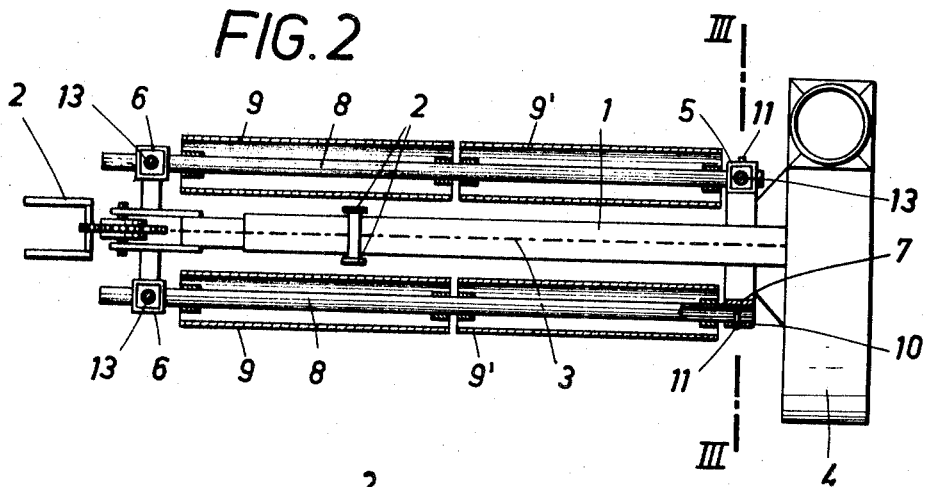
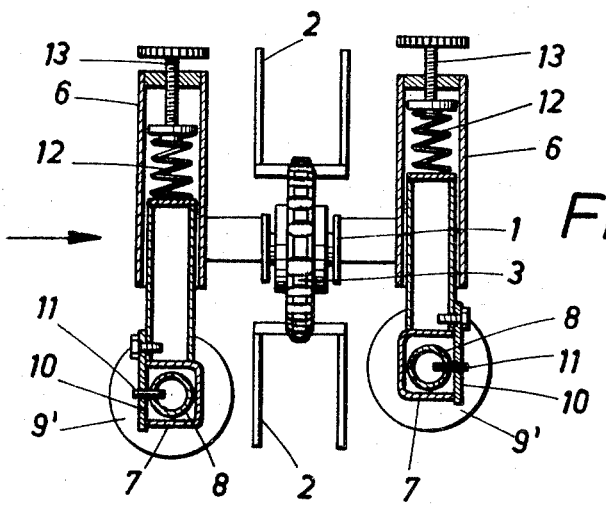

INVENTOR
KARL SCHERZ
BY
Kurt Kelman
AGENT

3,750,903

UNLOADER FOR REMOVING STOCK FOR A BODY OF STOCK CONTAINER IN A STORAGE SPACE

This invention relates to an unloader for removing stock from feed silos or the like, which unloader comprises an unloader arm, which is preferably gyratorily moved over the body of stock and which carries detaching and conveying means in the form of a revolving endless chain provided with scraper flights or in the form of a conveyor screw provided with tearing teeth, or the like.

A satisfactory unloading of stock by means of such unloaders requires that the stock is chopped into short lengths. That chopping can hardly be satisfactorily performed because numerous elements to be cut are in a more or less transverse orientation as they approach the inlet opening of the chopper and are then either cut into very long pieces or are not cut at all. Owing to the compressive stress in the stock, such uncut elements form parts of a coherent and partly interlaced mass, which cannot be readily removed. The unloaders must tear the stock from the body of stock, and sometimes only a few elements separate from the interlaced mass whereas large coherent bales are pulled from the surface of the body of stock at other times. These bales result in a clogging or in other trouble in the unloader or in the succeeding pneumatic conveyor.

When the stock has actually been chopped into short particles and consists, e.g., of chopped corn, difficulties will also arise because the short particles evade the scraper flights, tearing teeth or the like of the detaching and conveying means so that they are conveyed only at a small low rate.

It is an object of the invention to provide an unloader which is of the type defined first hereinbefore and in which a satisfactory detaching and conveying of stock from the body of stock in a uniform flow and without danger of clogging and a sufficiently high rate is ensured with simple means.

This object is accomplished by the invention essentially in that the unloader arm carries pressure rolls, which extend on both sides of the detaching and conveying means and parallel thereto throughout the length of said means and act on the body of stock. These pressure rolls hold down the stock on both sides of the detaching and conveying means so that a working channel for the tools is provided between the rolls which rest on the stock. This arrangement avoids a sudden detachment of relatively large bales of stock from the body of stock and a gripping of such bales by the conveying tools so that a uniform conveyance is obtained at a rate which is higher than with the known unloaders. Whereas with relatively long and interlaced stock, the pressure rolls serve to prevent the otherwise uncontrolled tearing of relatively large amounts of stock from the near and far environment of the working tools and thus to limit the range of action and the action of the tools, and the rolls prevent also an escape of stock consisting of short particles throughout.

To ensure that the rolls will apply a sufficiently high pressure to the surface of the body of stock, it is a feature of the invention that the pressure rolls are mounted to be displaceable in an at least approximately vertical direction and are under a downwardly directed spring bias. The initial stress of the springs which bias the pressure rolls may be variable so that the pressure applied can be selected in view of the operating conditions.

Alternatively, the vertically sliding mounted pressure rolls are adjustable in height and, if the rolls are spring biased, a stop may be provided which defines the uppermost position of the pressure rolls so that the depth of penetration of the tools of the detaching and conveying means can be adjusted. This design is particularly desirable with unloaders which are lowered by means of a tension cable or the like because in that case the pressure rolls limit the depth of penetration of the tools so that an overloading of the unloader by an excessive lowering or an excessive penetration of the tools will be prevented.

A particularly desirable design will be obtained if the unloader arm is provided at each of its two ends with two shock struts, which are provided at their lower end with sockets that are open on one side and can be closed by covers and serve to receive the axles for the pressure rolls, which axles may be tubular. Each axle is preferably axially fixed only in one socket. The sockets which are open on one side and can be closed by a cover enable a simple and fast insertion of the axles for the pressure rolls during assembling or after repairs. Because each pressure roll axle is axially fixed only in one socket, the length of the unloader arm may be changed when it is desired to re-tension the conveying chain or for similar purposes without need for additional manipulations.

Instead of the provision of shock struts for mounting the pressure rolls, the axles of the pressure rolls may be swingably mounted in rocker arms, which are secured to the unloader arm and may be biased by torsion bar springs.

The unloader arm performs, as a rule, a gyratory movement over the body of stock and the pressure rolls extending throughout the length of the unloader arm should roll on the surface of the body of stock. Cylindrical pressure rolls cannot satisfactorily perform such rolling movement, as a rule, because their peripheral velocity increases with the distance from the center of the gyratory movement. For this reason, the pressure rolls consist in accordance with the invention of a plurality of roll sections, which are freely rotatable relative to each other and the length of which preferably decreases toward the center of the gyratory movement of the unloader arm.

Finally in accordance sith the invention, the pressure rolls are provided with annular transverse ribs and/or longitudinal ribs so that their stock-retaining action is improved.

Figure 5:
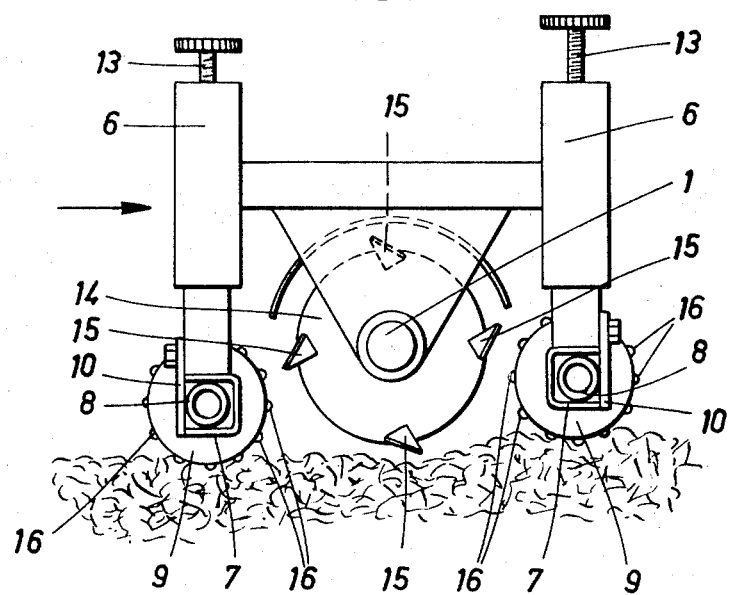

Two illustrative embodiments of the invention are shown by way of example in the drawings, which are drawn to different scales and in which FIG. 1 is a side elevation showing an unloader provided with a chain conveyor, FIG. 2 is a top plan view with the pressure rolls shown in section, FIG. 3 is a sectional view taken on line III—III in FIG. 2, FIG. 4 is a view similar to FIG. 2 and shows an unloader provided with a conveyor screw, and FIG. 5 is a sectional view taken on line V—V in FIG. 4.

An unloader arm 1 carries a revolving chain 3 provided with scraper flights 2 and is connected to a pneumatic conveyor 4 and performs a gyratory horizontal movement. The pneumatic conveyor is disposed approximately at the center of the gyratory movement. Two shock struts 5, 6 are secured to each end of the unloader arm 1 and have at their lower end a socket 7, which is open on one side and serves to receive the tubular axle 8 for pressure rolls 9, 9'. Each socket 7 is closed by a cover 10. A pin 11 in the covers 10 of the socket 7 of the shock struts 5 locks the axles 8 against rotation and axial displacement. For this reason, the unloader arm 1 may readily be telescopically extended for tensioning the chain when the pressure rolls are mounted, because the axles 8 may be displaced in the sockets 7 of the shock struts 6. The initial stress of the depressing springs 12 of the shock struts 5, 6 may be varied by means of the set screws 13. According to FIGS. 1 and 2, the pressure rolls extend parallel to the chain conveyor throughout the length thereof and consist of two roll sections 9, 9', which are freely rotatable relative to each other and roll on the body of stock during the gyratory movement of the unloader arm.

In the embodiment shown in FIGS. 4 and 5, the detaching and conveying means consist of a conveyor screw 14 provided with tearing teeth 15. In this case, each pressure roll consists of a plurality of roll sections 9, 9', 9'', which decrease in length toward the center of the gyratory movement of the unloader arm. FIG. 5 shows that the pressure rolls 9, 9', 9'' are provided with longitudinal ribs 16. In FIG. 5 just as in FIG. 3 the direction of the gyratory movement of the unloader arm 1 is provided by an arrow.

What is claimed is:
1. An unloader for removing fodder from a body of fodder contained in a silo, which comprises
   1. an unloader arm mounted over said body of fodder;
   2. an elongated fodder-detaching and conveying means of a predetermined length carried by the unloader arm and arranged to engage the body of fodder to detach fodder therefrom and to convey the detached fodder for removal from the silo; and
   3. a pair of freely rotatable pressure rolls of substantially the same length as the length of the fodder-detaching and conveying means, the pressure rolls being disposed on opposite sides of the fodder-detaching and-conveying means parallel thereto, and being arranged to apply pressure to the body of fodder along the length of the fodder-detaching and-conveying means engaging the body of fodder.

2. An unloader as set forth in claim 1, wherein the unloader arm is mounted for gyratory movement over the body of fodder about a center, the unloader arm extending radially from the center, and each of the pressure rolls consisting of a plurality of roll sections.

3. An unloader as set forth in claim 2, in which the length of said roll sections of each of said rolls decreases in the direction toward said center.

4. An unloader as set forth in claim 1, in which said fodder-detaching and conveying means comprises a revolving endless chain provided with scraper flights engageable with said body of stock.

5. An unloader as set forth in claim 1, in which said fodder-detaching and conveying means comprises a conveyor screw provided with tearing teeth engageable with said body of stock.

6. An unloader as set forth in claim 1, which comprises
   pressure roll-mounting means carried by said unloader arm,
   said pressure rolls being mounted in said mounting means for movement relative thereto in an at least approximately vertical direction, and
   spring means exerting a downward bias on said pressure rolls.

7. An unloader as set forth in claim 6, which comprises means for varying the initial stress of said spring means.

8. An unloader as set forth in claim 6, which comprises stop means defining an upper limit for the position of the pressure rolls.

9. An unloader as set forth in claim 1, which comprises
   two pairs of shock struts, each of which pairs are secured to one end of said unloader arm,
   each of said shock struts having a free lower end provided with a socket which is open on one side,
   detachable covers closing said sockets, and
   two axles, each of which is mounted in two of said sockets,
   each of said pressure rolls being rotatably mounted on one of said axles.

10. An unloader as set forth in claim 9, in which said axles are tubular.

11. An unloader as set forth in claim 9, in which each of said axles is axially fixed in one of said sockets and axially slidable relative to the other of said sockets.

* * * * *